United States Patent
McConnell et al.

(10) Patent No.: US 6,727,603 B1
(45) Date of Patent: Apr. 27, 2004

(54) AUTOMATIC MODE TRANSITIONS FOR MICROTURBINE GENERATING SYSTEMS

(75) Inventors: Robert W. McConnell, Ranch Palos Verdes, CA (US); Daniel W. Trimble, Los Angeles, CA (US); David C. Lewis, Hermosa Beach, CA (US)

(73) Assignee: Hybrid Power Generation Systems LLC, Torrance, CA (US)

( * ) Notice: Subject to any disclaimer, the term of this patent is extended or adjusted under 35 U.S.C. 154(b) by 175 days.

(21) Appl. No.: 09/923,713

(22) Filed: Aug. 7, 2001

(51) Int. Cl.[7] .................................................. H02J 7/00
(52) U.S. Cl. ............................ 307/64; 307/43; 307/66; 307/80; 307/85
(58) Field of Search ............................... 307/64, 43, 66, 307/80, 85

(56) References Cited

U.S. PATENT DOCUMENTS

| | | |
|---|---|---|
| 4,029,951 A | 6/1977 | Berry et al. |
| 4,031,407 A | 6/1977 | Reed |
| 4,195,231 A | 3/1980 | Reed et al. |
| 4,308,463 A | 12/1981 | Giras et al. |
| 4,455,614 A | 6/1984 | Martz et al. |
| 4,536,126 A | 8/1985 | Reuther |
| 5,811,960 A * | 9/1998 | Van Sickle et al. ............. 322/4 |
| 5,855,112 A | 1/1999 | Bannai et al. |
| 5,929,538 A | 7/1999 | O'Sullivan et al. |
| 5,994,872 A | 11/1999 | Hall |
| 6,031,294 A | 2/2000 | Geis et al. |
| 6,055,163 A * | 4/2000 | Wagner et al. ................. 363/37 |
| 6,064,122 A | 5/2000 | McConnell |
| 6,072,302 A | 6/2000 | Underwood et al. |
| 6,093,975 A | 7/2000 | Peticolas |
| 6,118,238 A | 9/2000 | Munro et al. |
| 6,128,204 A | 10/2000 | Munro et al. |
| 6,147,414 A | 11/2000 | McConnell et al. |
| 6,169,334 B1 | 1/2001 | Edelman |
| 6,304,006 B1 * | 10/2001 | Jungreis ....................... 307/64 |
| 6,417,775 B1 * | 7/2002 | Culler et al. ................. 340/635 |
| 6,441,505 B1 * | 8/2002 | Poletti et al. ................ 290/1 A |
| 6,476,697 B2 * | 11/2002 | Swartzentruber et al. ... 335/132 |
| 6,538,345 B1 * | 3/2003 | Maller ......................... 307/86 |

FOREIGN PATENT DOCUMENTS

| | | |
|---|---|---|
| EP | 0472294 A1 | 7/1991 |
| RU | 2030054 C * | 2/1995 |
| WO | WO97/09524 | 3/1997 |

* cited by examiner

Primary Examiner—Robert L. DeBeradinis
(74) Attorney, Agent, or Firm—Sutherland Asbill & Brennan LLP

(57) ABSTRACT

A system and method for controlling a microturbine generator system comprising: providing a computer control unit; providing a utility power grid sensor input line to the computer control unit; and providing a utility power grid disconnect command output line from the computer control unit; and causing, via the computer control unit, automatic transitions of the microturbine generator system between at least four states, the at least four states comprising a generator standby backup mode, a generator standalone mode, a transfer to standby backup mode, and a generator startup battery charging mode.

20 Claims, 2 Drawing Sheets

US 6,727,603 B1

AUTOMATIC MODE TRANSITIONS FOR MICROTURBINE GENERATING SYSTEMS

BACKGROUND OF THE INVENTION

Field of the Invention (Technical Field)

The present invention relates to control techniques and systems for generating mode transitions between grid-connected and standalone modes for microturbine generating systems. This field is unlike that comprising standard backup generators, such as diesel-driven generators, which typically have only two modes, on and off.

SUMMARY OF THE INVENTION (DISCLOSURE OF THE INVENTION)

The present invention is of a system and method for controlling a microturbine generator system comprising: providing a computer control unit; providing a utility power grid sensor input line to the computer control unit; and providing a utility power grid disconnect command output line from the computer control unit; and causing, via the computer control unit, automatic transitions of the microturbine generator system between at least four states, the at least four states comprising a generator standby backup mode, a generator standalone mode, a transfer to standby backup mode, and a generator startup battery charging mode. In the preferred embodiment, the at least four states additionally comprises a transfer to standalone mode. A utility circuit breaker status input line to the computer control unit is also preferred. The computer control unit in causing a transition to generator standalone mode causes the generator to start, disconnects the load from the utility power grid and then connects the load to output from the generator. The computer control unit in causing a transition to transfer to standby backup mode causes the generator to enter a power-down sequence, disconnects the load from output from the generator, and connects the load to the utility power grid. The computer control unit in causing a transition to generator startup battery charging mode causes the generator to run, maintains disconnection of the load from output from the generator, and maintains connection of the load to the utility power grid. The computer control unit causes a transition to generator startup battery charging mode at periodic intervals. A contactor connects and disconnects the load from the utility power grid and is controlled by the utility power grid disconnect command output line. The contactor comprises an auxiliary contact for providing status of the contactor to the computer control unit via a utility grid disconnect relay status line. A utility grid disconnect-relay controls the contactor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the Invention. In the drawings.

DETAILED DESCRIPTION

Figure 1:
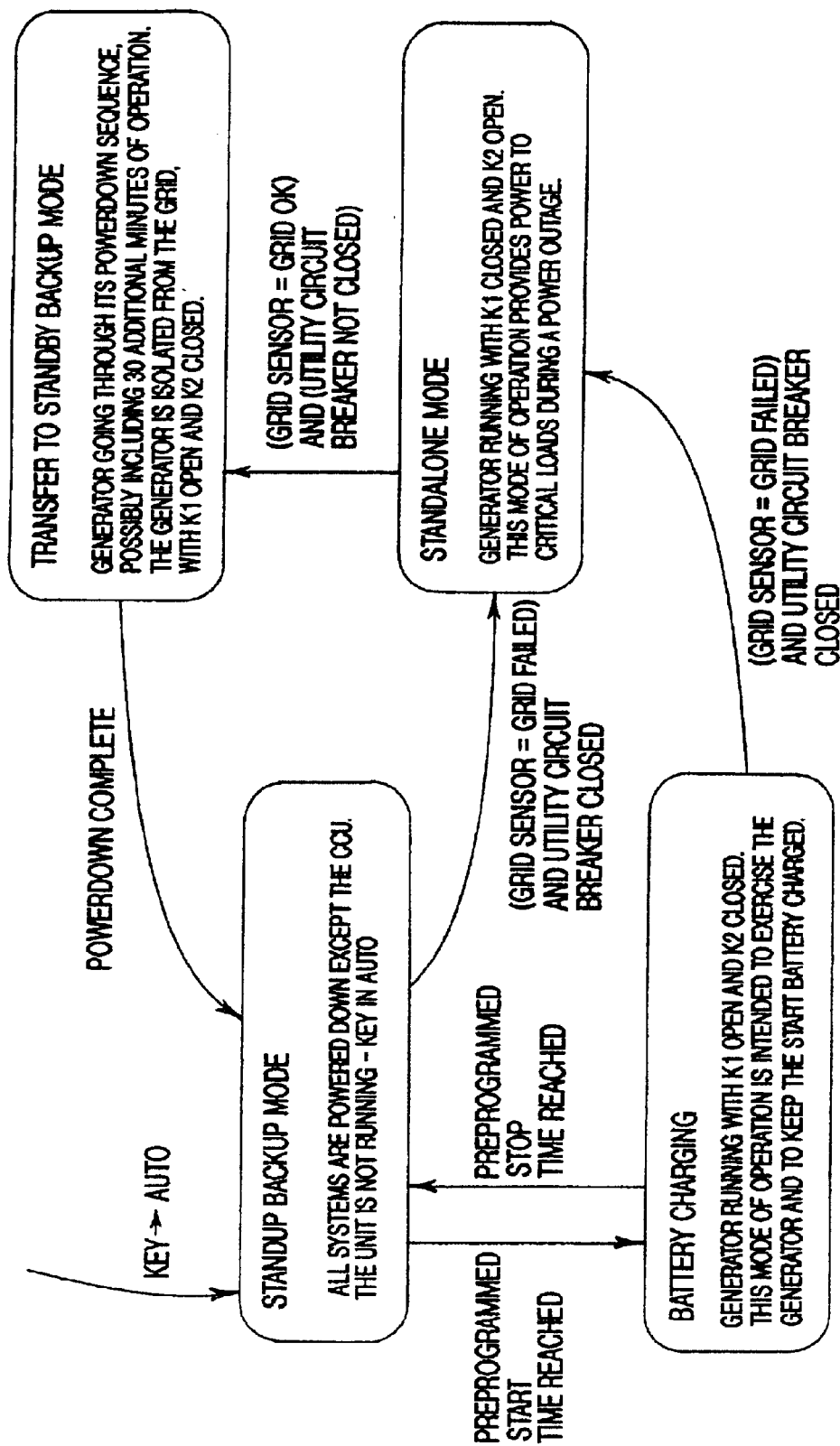
FIG. 1 is a state transition diagram illustrating the preferred operation of the invention.

The present invention is of a method and system for providing backup power to site loads when a utility grid goes out of tolerance. The invention provides for automatic transitions between four states of a backup microturbine generator system: (1) Standby Backup Mode; (2) Standalone Mode; (3) Transfer to Standby Backup Mode; and (4) Battery Charging Mode (see FIG. 1). The invention additionally provides for certain procedures during transfer to Standalone Mode. Microturbines are high speed, single or dual shaft, low compression turbine-driven generators of electricity and/or other power, and producing up to about 500 kW. They are multi-fuel, modular distributed power generation units having multiple applications.

Standby Backup Mode. To enter this mode of operation, preferably a "standby backup operation" bit should be set in a module configuration file (which also specifies other configuration values a set forth below) and a control key-switch should be in the Auto position. In this mode, a system according to the invention will wait, engine not operating, but constantly monitoring grid voltage for over/under voltage (preferably approximately +15%/−20% of nominal value), over/under frequency (preferably approximately +/−5% of nominal value), and loss of one or more phases. The values can be tailored to specific site requirements.

Transfer to Standalone Mode. When grid voltage fails or is out of tolerance, a grid sensor waits a period (preferably approximately 10 seconds) for the grid to return to tolerance before sending a grid fault signal to the Central Computer Unit (CCU) of the invention. If the grid fault exists after another period (referred to as "Twait"), preferably user adjustable between approximately 10 seconds and 30 minutes), the CCU automatically disconnects the load from the grid and at the same time starts the generator. The startup process may require enclosure purging prior to engine start and also a short period before the system is ready to load.

Standalone Mode. In Standalone Mode, the generator provides power to the site load. Preferably the system can also sequence power to a plurality of site loads (e.g., three loads) with delay times adjustable between the sequencing on or off for each load. This sequence is the same as when the site is started by the grid. This helps to ensure smooth generator operation in Standalone Mode.

Figure 2:
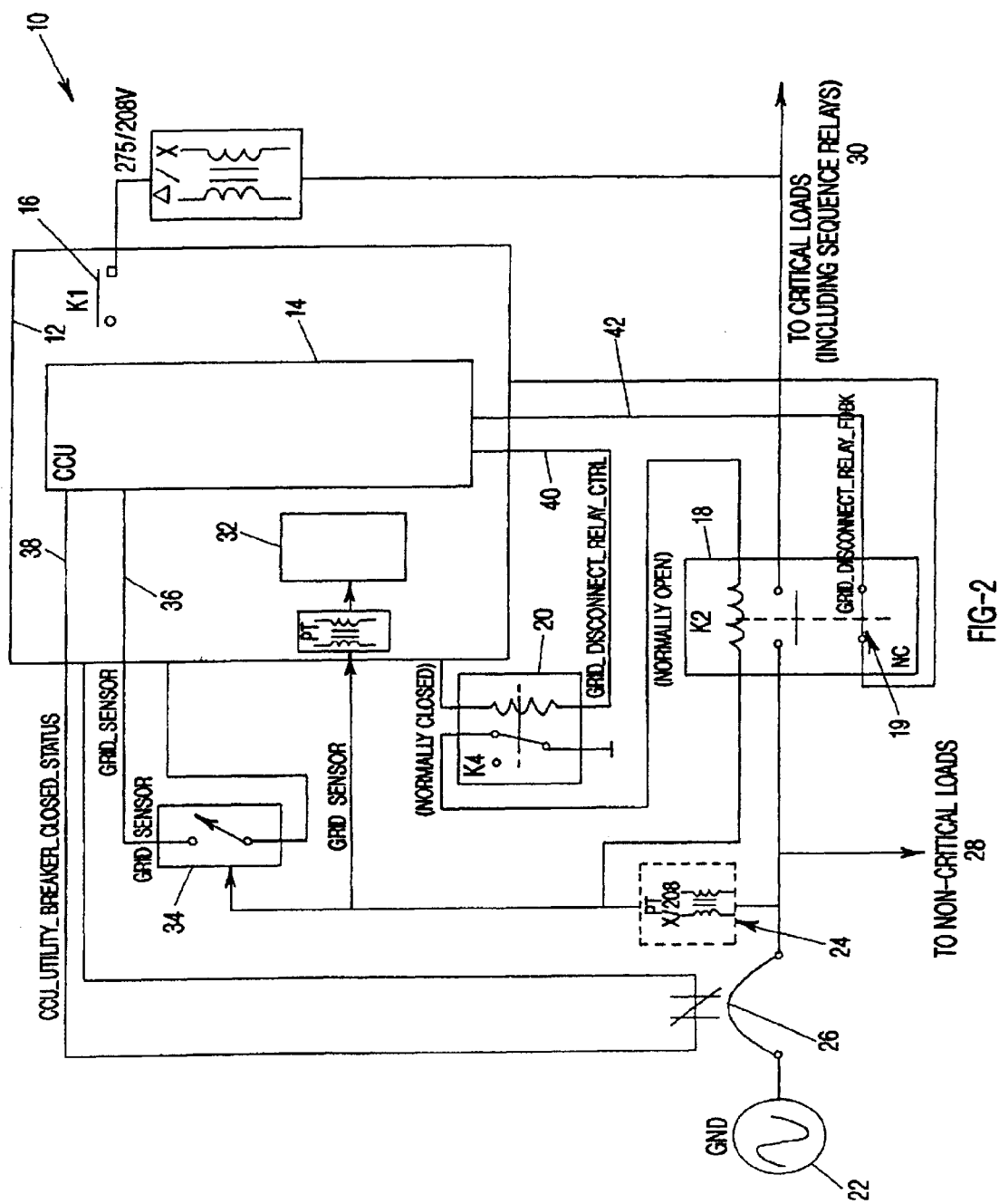
FIG. 2 is a block diagram of the preferred control system of the invention.

Transfer to Standby Backup Mode. While in Standalone Mode, when the grid returns to tolerance the generator continues to run for a period (referred to as "T_stand_min", preferably in seconds) to verify the grid condition. The grid is considered normal if no fault is detected for a period (referred to as "Tgrid_return", preferably in seconds). When tolerance has been restored the CCU initiates transition to Standby Backup Mode by transferring the load(s) back to the grid. Referring to FIG. 2, this is preferably accomplished by: (1) causing K1 to open; (2) waiting a delay period (referred to as "K_refdly", preferably in milliseconds) before closing K2 circuit breaker; (3) optionally causing the system to enter Battery Charging Mode.

Battery Charging Mode. Due to the possibly large amount of time between operating periods, the generator may be set to run at specified intervals (and/or after Transfer to Standby Backup Mode) to charge a start battery. For this operation, the generator would not close its K1 contactor or isolate the load(s) from the grid. Rather, the generator would only run to charge the battery (such as for an approximate 30 minutes charge time or until the battery achieves proper state of charge for the given operating temperature). A preferred schedule would be once monthly for one hour.

The preferred system 10 of the invention is shown in FIG. 2, comprising generator 12, CCU 14, K1 contactor 16, K2 circuit breaker 18 (normally open), auxiliary contact 19 (normally closed), K4 circuit breaker 20 (normally closed), grid 22, transformer 24 if required to transform system voltages to 208VL-L (208 volt line-to-line), 120VL-N (120 volt line-to-neutral), utility circuit breaker 26 (uncontrolled), power to non-critical loads 28, power to critical loads 30, transient protection module (TPM) 32, grid sensor 34, grid sensor line 36 to CCU, utility breaker closed status line 38 to CCU, grid disconnect control line 40, and grid disconnect relay feedback line 42, and other electrical elements as shown.

The grid sensor is preferably a compact (2"×2") encapsulated module which measures continuously the voltage of each of the three phases. It senses under and over voltage, voltage unbalance, phase loss, and phase reversal. The trip points and time delays are preferably fixed and calibrated, so no user adjustment is required.

The K2 contactor is used to connect or disconnect an electrical load from the grid and an provide feedback status to the CCU. This is preferably provided by a normally open Nema 5 contactor rated for 100 KVA (as an example) with voltage rating depending on application (preferably from approximately 120 to 600V). The normally closed auxiliary contact is used to provide a contactor position status to the CCU in a 12 volt circuit via the grid disconnect relay feedback line.

The K4 grid disconnect relay is used to control the K2 contactor. A standard 12V DC relay with 100 mA SPST contact is preferred. The coil drive to the K4 relay is supplied by the CCU and should not require more than a set current load for activation via the grid disconnect relay control line.

Grid disconnect relay control line is preferably connected through a transient protection module (TPM) and to the coil of the normally closed relay K4. The relay controls the isolation of the grid from the user loads.

The utility breaker closed status line is connected through the TPM and to the normally closed contact of the utility circuit breaker. It indicates whether the utility circuit breaker is open or closed.

The grid sensor line is connected through the TPM and to the normally open contact of the grid sensor. It indicates whether the grid is operating within tolerance.

The grid disconnect relay feedback line is connected through the TPM and to the normally closed auxiliary contact of the grid disconnect relay K2.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A controller for a microturbine generator system, said controller comprising:
   a computer control unit;
   a utility power grid sensor input line to said computer control unit; and
   a utility power grid disconnect command output line from said computer control unit;
   wherein said computer control unit causes automatic transitions of the microturbine generator system between at least four states, said at least four states comprising a generator standby backup mode, a generator standalone mode, a transfer to standby backup mode, and a generator startup battery charging mode.

2. The controller of claim 1 wherein said at least four states additionally comprises a transfer to standalone mode.

3. The controller of claim 1 additionally comprising a utility circuit breaker status input line to said computer control unit.

4. The controller of claim 1 wherein said computer control unit in causing a transition to generator standalone mode causes a generator to start, disconnects the load from a utility power grid and then connects a load to an output from the generator.

5. The controller of claim 1 wherein said computer control unit in causing a transition to transfer to standby backup mode causes a generator to enter a power-down sequence, disconnects a load from an output from the generator, and connects the load to a utility power grid.

6. The controller of claim 1 wherein said computer control unit in causing a transition to generator startup battery charging mode causes a generator to run, maintains disconnection of a load from an output from the generator, and maintains connection of the load to a utility power grid.

7. The controller of claim 6 wherein said computer control unit causes a transition to generator startup battery charging mode at periodic intervals.

8. The controller of claim 1 additionally comprising a contactor to connect and disconnect a load from a utility power grid and controlled by said utility power grid disconnect command output line.

9. The controller of claim 8 wherein said contactor comprises an auxiliary contact for a providing status of said contactor to said computer control unit via a utility grid disconnect relay status line.

10. The controller of claim 8 additionally comprising a utility grid disconnect relay controlling said contactor.

11. A method for controlling a microturbine generator system, the method comprising the steps of:
    providing a computer control unit;
    providing a utility power grid sensor input line to the computer control unit; and
    providing a utility power grid disconnect command output line from the computer control unit; and
    causing, via the computer control unit, automatic transitions of the microturbine generator system between at least four states, the at least four states comprising a generator standby backup mode, a generator standalone mode, a transfer to standby backup mode, and a generator startup battery charging mode.

12. The method of claim 11 wherein in the causing step the at least four states additionally comprises a transfer to standalone mode.

13. The method of claim 11 additionally comprising the step of providing a utility circuit breaker status input line to the computer control unit.

14. The method of claim 11 wherein in the causing step the computer control unit in causing a transition to generator standalone mode causes a generator to start, disconnects the load from a utility power grid and then connects a load to an output from the generator.

15. The method of claim 11 wherein in the causing step the computer control unit in causing a transition to transfer to standby backup mode causes a generator to enter a power-down sequence, disconnects a load from an output from the generator, and connects the load to a utility power grid.

16. The method of claim 11 wherein in the causing step the computer control unit in causing a transition to generator startup battery charging mode causes a generator to run, maintains disconnection of a load from an output from the generator, and maintains connection of the load to a utility power grid.

17. The method of claim 16 wherein in the causing step the computer control unit causes a transition to generator startup battery charging mode at periodic intervals.

18. The method of claim 11 additionally comprising the step of providing a contactor to connect and disconnect a load from a utility power grid and controlled by the utility power grid disconnect command output line.

19. The method of claim 18 wherein, in the step of providing a contactor, the contactor comprises an auxiliary contact for providing status of the contactor to the computer control unit via a utility grid disconnect relay status line.

20. The method of claim 18 additionally comprising the step of providing a utility grid disconnect relay controlling the contactor.

* * * * *